United States Patent
Aggarwal et al.

(10) Patent No.: US 9,935,785 B2
(45) Date of Patent: Apr. 3, 2018

(54) SYSTEM AND METHOD FOR FULL-DUPLEX MEDIA ACCESS CONTROL USING REQUEST-TO-SEND SIGNALING

(75) Inventors: Vaneet Aggarwal, Parsippany, NJ (US); Rittwik Jana, Parsippany, NJ (US); Christopher W. Rice, Parsippany, NJ (US); Nemmara K. Shankaranarayanan, Bridgewater, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 853 days.

(21) Appl. No.: 13/618,096

(22) Filed: Sep. 14, 2012

(65) Prior Publication Data

US 2014/0078940 A1 Mar. 20, 2014

(51) Int. Cl.
*H04L 5/14* (2006.01)
*H04L 12/40* (2006.01)
*H04L 1/18* (2006.01)

(52) U.S. Cl.
CPC ........ *H04L 12/40013* (2013.01); *H04L 1/188* (2013.01); *H04L 1/1854* (2013.01); *H04L 1/1887* (2013.01); *H04L 5/14* (2013.01)

(58) Field of Classification Search
CPC ..... H04L 47/10; H04L 29/06; H04L 12/2856; H04L 12/413; H04L 5/14; H04L 69/14; H04L 69/18; H04L 47/14; H04L 5/16; H04L 43/0847; H04L 1/1854; H04L 1/0031; H04L 1/0083; H04L 5/0078; H04L 26/46; H04L 69/324; H04L 12/6418; H04L 5/143; H04J 3/1694; H04J 4/00; H04W 52/50; H04W 88/08; H04W 16/14; H04W 74/00; H04W 88/06; H04W 84/12; H04W 72/04; H04W 72/0406; H04W 74/0816; H04W 74/08; H04W 74/0808; H04W 74/0891; H04W 28/18

USPC ....... 370/277, 276, 328, 329, 278, 280, 282, 370/445, 296, 347

See application file for complete search history.

(56) References Cited

U.S. PATENT DOCUMENTS

| | | | |
|---|---|---|---|
| 7,466,676 B2 | 12/2008 | Gupta et al. | |
| 7,673,075 B1 * | 3/2010 | Masiewicz | G06F 13/4286 710/2 |
| 8,462,671 B2 | 6/2013 | Rinne et al. | |
| 8,472,467 B2 | 6/2013 | Oyman et al. | |
| 8,804,583 B2 | 8/2014 | Aggarwal et al. | |

(Continued)

OTHER PUBLICATIONS

U.S. Appl. No. 13/549,214, filed Jul. 13, 2012, Aggarwal et al.

(Continued)

*Primary Examiner* — Charles C Jiang
*Assistant Examiner* — Rose Clark

(57) ABSTRACT

A system and method for full-duplex communications provided by modifying the Media Access Control sub-layer of communication node protocols. The modification allows communication nodes to communicate with one another in full-duplex, where each node transmits and receives data simultaneously with other nodes in a single frequency. A timing of the simultaneous data transmissions, acknowledgments, and short-interframe-space waiting periods can be determined based on network-allocation-vector data transmitted in association with request-to-send or clear-to-send signals.

20 Claims, 5 Drawing Sheets

(56) References Cited

U.S. PATENT DOCUMENTS

| | | | |
|---|---|---|---|
| 8,842,584 B2 | 9/2014 | Jana et al. | |
| 9,094,196 B2 | 7/2015 | Aggarwal | |
| 2002/0071448 A1* | 6/2002 | Cervello et al. | 370/445 |
| 2006/0149963 A1 | 7/2006 | Lu et al. | |
| 2007/0060158 A1* | 3/2007 | Medepalli | H04W 72/085 455/450 |
| 2007/0153760 A1* | 7/2007 | Shapira | H04B 7/2681 370/350 |
| 2007/0177435 A1* | 8/2007 | Beach | 365/189.05 |
| 2008/0008126 A1* | 1/2008 | Shirakabe et al. | 370/329 |
| 2008/0080553 A1* | 4/2008 | Hasty | H04L 1/0002 370/468 |
| 2008/0112517 A1 | 5/2008 | Parts et al. | |
| 2010/0232324 A1* | 9/2010 | Radunovic et al. | 370/277 |
| 2010/0329131 A1* | 12/2010 | Oyman | H04W 74/085 370/252 |
| 2011/0051796 A1 | 3/2011 | Khayrallah | |
| 2011/0116401 A1* | 5/2011 | Banerjea | H04W 74/0816 370/252 |
| 2011/0182216 A1 | 7/2011 | Ono et al. | |
| 2011/0244790 A1 | 10/2011 | Kwak et al. | |
| 2011/0317633 A1 | 12/2011 | Tan et al. | |
| 2012/0008599 A1* | 1/2012 | Marin | H04W 74/006 370/336 |
| 2012/0106371 A1 | 5/2012 | Abraham | |
| 2012/0147790 A1 | 6/2012 | Khojastepour et al. | |
| 2012/0155336 A1 | 6/2012 | Khojastepour et al. | |
| 2012/0177017 A1 | 7/2012 | Gong | |
| 2012/0182867 A1* | 7/2012 | Farrag | H04W 28/0236 370/230 |
| 2012/0201153 A1 | 8/2012 | Bharadia et al. | |
| 2012/0320887 A1* | 12/2012 | Chintalapudi | H04W 74/0841 370/338 |
| 2013/0051335 A1* | 2/2013 | Adachi | H04W 74/0808 370/329 |
| 2013/0155912 A1* | 6/2013 | Khojastepour | H04W 72/0413 370/277 |
| 2013/0188760 A1 | 7/2013 | Subramanian et al. | |
| 2013/0201857 A1* | 8/2013 | Bhargava et al. | 370/252 |
| 2013/0215805 A1 | 8/2013 | Hong et al. | |
| 2013/0223294 A1 | 8/2013 | Karjalainen et al. | |
| 2013/0244720 A1 | 9/2013 | Hsia et al. | |
| 2013/0250866 A1 | 9/2013 | Hui et al. | |
| 2013/0301487 A1 | 11/2013 | Khandani | |
| 2014/0010145 A1 | 1/2014 | Liu et al. | |
| 2014/0016515 A1 | 1/2014 | Jana et al. | |
| 2014/0016516 A1 | 1/2014 | Aggarwal et al. | |
| 2014/0044038 A1* | 2/2014 | Zhang | H04L 1/1854 370/328 |
| 2014/0078940 A1 | 3/2014 | Aggarwal et al. | |

OTHER PUBLICATIONS

U.S. Appl. No. 13/549,189, filed Jul. 13, 2012, Jana et al.

U.S. Appl. No. 13/606,985, filed Sep. 7, 2012, Aggarwal et al.

Everett et al., "Empowering full-duplex wireless communication by eploiting directional diversity," Conference Record of the Forty Fifth Asilomar Conference on Signals, Systems and Computers (ASILOMAR), 2011, Nov. 6-9, 2011, pp. 2002-2006; ISBN: 978-1-4673-0321-7.

S. Sen, R. R. Choudhury, and S. Nelakuditi, CSMA/CN: Carrier Sense Multiple Access with Collision Notification, *In Proceedings of ACM Mobicom*, Illinois, USA, Aug. 2010.

A. Sahai and G. Patel and A. Sabharwal. Pushing the limits of Full-duplex: Design and Real-time implementation. In arXiv.org: 1107.0607, 2011.

S. Sen, R. R. Choudhury, and S. Nelakuditi. No time to Countdown: Migrating Backoff to the Frequency in Domain. *In Proceedings of the ACM Mobicom*, Nevada, USA, Sep. 2011.

N. Singh and D. Gunawardena and A. Proutiere and B. Radunovia and H.V. Balan and P. Key. Efficient and Fair MAC for wireless networks with self-interference cancellation. In *Proceedings of WiOpt*, Princeton, NJ, 2011.

J. Choi and M. Jain and K. Srinivasan and P. Levis and S. Katti, Achieving Single Channel, Full Duplex Wireless Communication. In *Proceedings of the ACM Mobicom*, Illinois, USA, 2011. ACM New York, NY, USA.

M. Duarte, A. Sabharwal. Full-Duplex Wireless Communications Using Off-The-Shelf Radios: Feasibility and First Results, Forty-Fourth Asilomar Conference on Signals, Systems, and Computers, 2010.

M. Jain, J. Choi, T. Kim, D. Bharadia, K. Srinivasan, S. Seth, P. Levis, S. Katti and P. Sinha. Practical, Real-time, Full Duplex Wireless, In *Proceedings of the 17$^{th}$ Annual International Conference on Mobile Computing and Networking (Mobicom* 2011).

\* cited by examiner

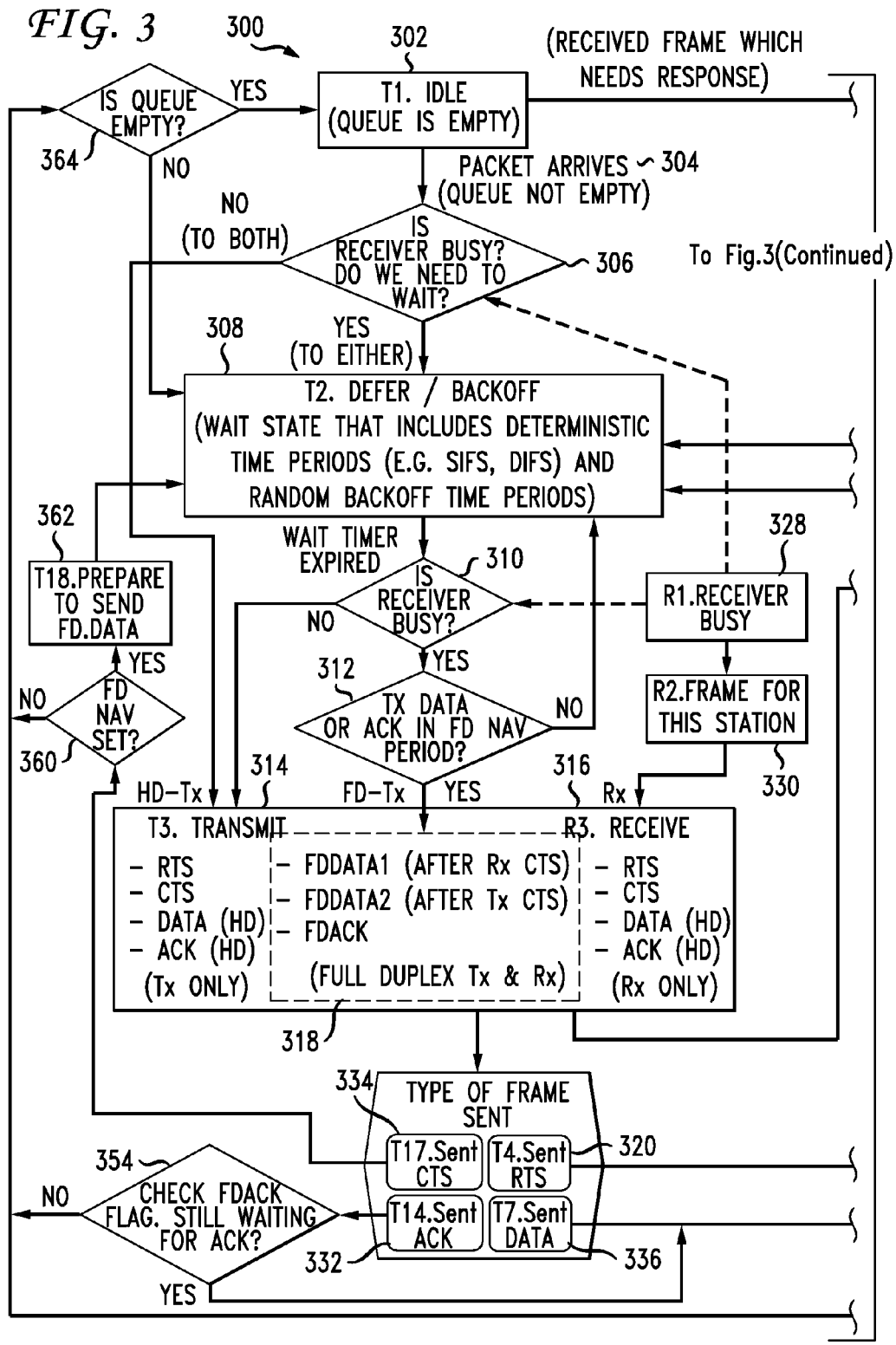

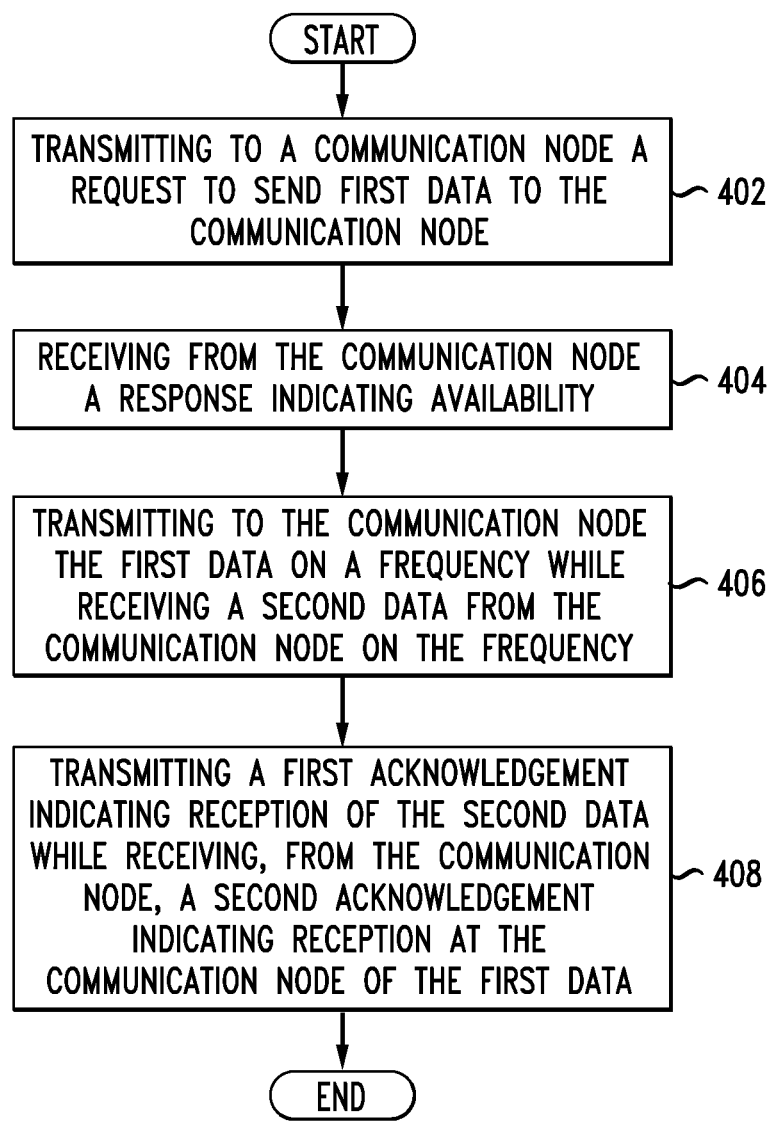

SYSTEM AND METHOD FOR FULL-DUPLEX MEDIA ACCESS CONTROL USING REQUEST-TO-SEND SIGNALING

CROSS-REFERENCE TO RELATED APPLICATIONS

This application is related to U.S. patent application Ser. No. 13/549,189, filed Jul. 13, 2012, which is incorporated by reference. This application is further related to U.S. patent application Ser. No. 13/549,214, filed Jul. 13, 2012, which is incorporated by reference.

BACKGROUND

1. Technical Field

The present disclosure relates to full-duplex communications and more specifically to modifications to the Media Access Control sub-layer of communication node protocols in full-duplex mode, where the modifications coordinate communicating simultaneous data and simultaneous acknowledgements between two or more communication nodes while further coordinating time periods between requests, responses, data, acknowledgments, and subsequent communication cycles.

2. Introduction

All network-capable computing devices have unique identifiers assigned to them at manufacture, enabling communications with other network-capable computing devices. These unique identifiers are called Media Access Control addresses and serve to identify the computing device when communicating with other computing devices, either wirelessly or via a wired connection. With wired connections, transmit and receive signals are kept separate by using separate pins or physical wires for transmitting and receiving communications. However, when the computing device communicates wirelessly, specific protocols ensure that both the transmitting device and the receiving device are effectively engaged. These protocols rely upon the Media Access Control addresses of individual computing devices while affecting the Media Access Control sub-layer of the Open System Interconnection (OSI) model. Because these protocols effectively control all incoming and outgoing communications, the protocols for managing communications are themselves simply referred to as the MAC.

Previous versions of the MAC work effectively with half-duplex communications, where a first communication node and a second communication node communicate one at a time in a single frequency channel. However, these previous MAC versions were not designed for full-duplex communications, where both the first communication node and the second communication node are transmitting and receiving on a single channel simultaneously.

BRIEF DESCRIPTION OF THE DRAWINGS

FIG. 4 illustrates an example method embodiment.

DETAILED DESCRIPTION

Figure 1:
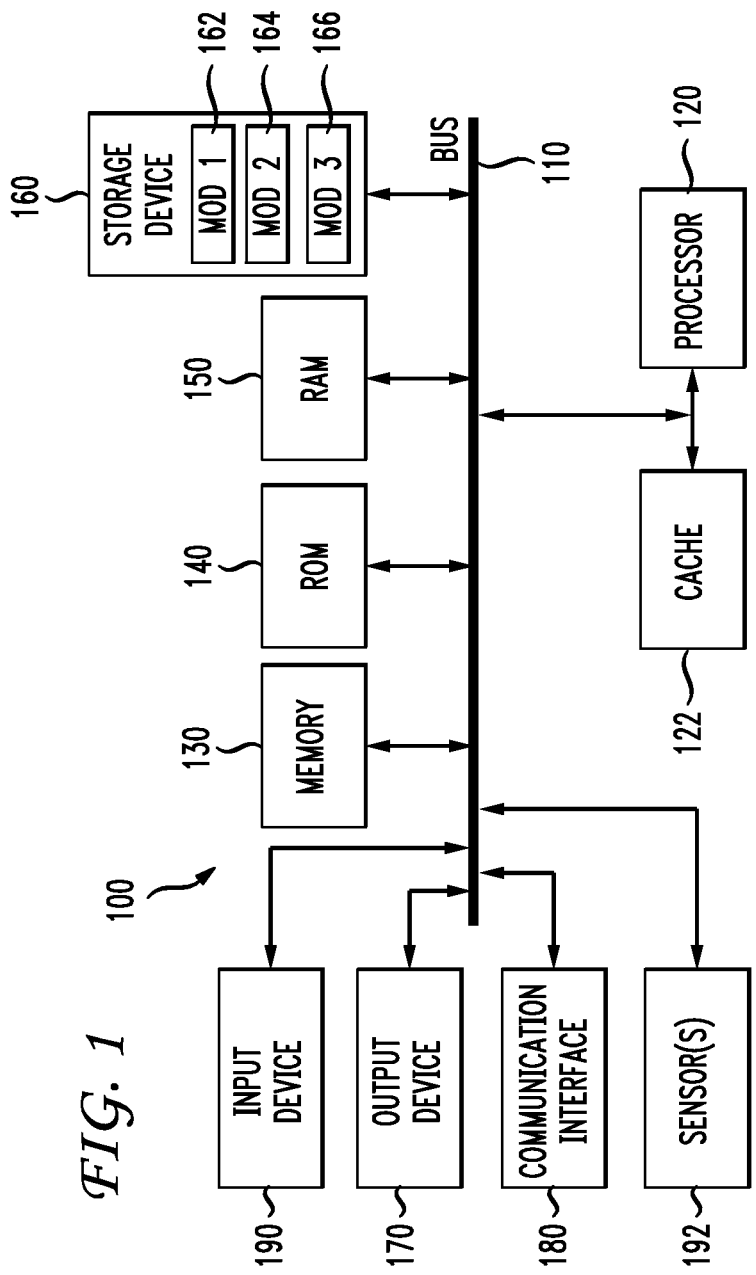
FIG. 1 illustrates an example system embodiment.

A system, method and non-transitory computer-readable media are disclosed which improves wireless communication networks, such as WiFi networks, by providing an improved Media Access Control protocols, otherwise known as the MAC. The improved MAC disclosed herein can facilitate communications both with full-duplex and half-duplex clients, allowing a communication node to both transmit and receive data simultaneously in a single frequency. In addition, the MAC disclosed herein can use a Request-to-Send (RTS) and Clear-to-Send (CTS) sequence to initiate full-duplex or half-duplex communications with other communication nodes. This ability to engage in both full-duplex and half-duplex communications enables communication nodes to communicate with both other full-duplex enable communication nodes and previously deployed, half-duplex only, communication nodes. The disclosed feature can use information contained within RTS and CTS transmissions to coordinate data transmissions and transmissions of acknowledgements.

As an example, consider a system configured to perform a method of transmitting a request-to-send (RTS) data to a communication node. This RTS can contain a Network Allocation Vector (NAV) indicating the overall length of time or amount of data the system will be communicating. The system can then receive a CTS from the communication node, indicating that the node is available to receive the data from the system. The CTS can also contain a NAV. The RTS-CTS exchange, or handshake, between the system and the communication node helps coordinate and plan communication of data in full-duplex mode. In addition, by including NAV data in the RTS-CTS handshake, both the system and the communication node are aware of the amount of data to expect, and can match transmissions or otherwise adjust transmissions. Other communication nodes, which are not part of the immediate communication link between the system and the communication node, are made aware by NAV data how long they should ignore collisions and other data received. The system then transmits the data to the communication node while simultaneously receiving additional data from the communication node, where the system and the node communicate the information transmitted and received in a single frequency channel. This bi-directional communication in a single frequency channel is known as full-duplex communications. With the system and the communication node each transmitting and receiving simultaneously, the overall bandwidth and data communicated between the system and the communication node can increase and the overall time necessary for communicating specific amounts of data decrease. Both the system and the communication node then transmit and receive acknowledgement signals indicating that the data was received by both the system and the communication node.

By matching or coordinating the specific times of data and acknowledgment transmissions, the overall system can achieve a higher overall efficiency. To maintain coordination of these specific timings, a system configured according to this disclosure can have short-interframe-spaces (SIFS) between certain actions, such as the time between receiving a RTS and beginning transmission of a CTS, the time after transmitting the CTS and beginning transmission of the data, and the time after transmitting the data prior to sending the acknowledgment. Each SIFS period can be identical or the SIFS period can be specific to a particular time period. Moreover, these SIFS periods can be predetermined, or can be modified and dynamically updated by the system as needed during operation. After transmission of the acknowledgements, the system and the communication node each wait a period of time prior to beginning the next round of data exchange. This period of time is known as the Distributed Coordination Function InterFrame Space (DIFS). During this time, the other nodes which were not part of the communication link between the system and the communication node effectively "wake up," stop ignoring collisions on the frequency, and prepare should they be part of a future data exchange. If the system, the communication node, or the other nodes detect errors in the data transmission, the network of communication nodes can wait for an Extended-InterFrame-Space (EIFS), allowing the network to ensure errors and collisions have ended prior to beginning the next round of data exchange. The EIFS is normally, though not always, a longer amount of time than the DIFS.

The time associated with EIFS is important to IEEE 802.11 compliant devices because if a node receives a frame in error, it cannot decode NAV data, and therefore does not know how long to ignore (or defer) signals intended for other nodes. The EIFS is imposed by the 802.11 standard as a longer wait period, calculated such that the node will try to contend only after the data exchange has time to completely exchange. The EIFS is triggered when a node receives a frame in error, which can happen when a node does not defer other signals for the correct amount of time (i.e., a collision occurs). In full-duplex, two frames commonly occur at the same time. The intended full-duplex nodes can decode the frames properly, but other nodes view this full-duplex communication as a collision. One exemplary way of countering this in a full-duplex network is to suppress the EIFS behavior for all full-duplex nodes which receive the CTS signal properly, because they would then also receive the NAV data properly. Those nodes should know that they should ignore any collisions during that NAV period.

In a network containing a mixture of full-duplex and half-duplex capable nodes, the half-duplex nodes will remain compliant with the 802.11 standard and enforce the EIFS time period. Because, per the previous example, the full-duplex nodes could simply ignore the collision, and because the half-duplex nodes must enforce the 802.11 standard, the half-duplex nodes are placed at a relative disadvantage. In such a situation, one exemplary way of correcting such a situation is by adjusting inter-frame space (IFS). An IFS can be deployed between the CTS and data transmission/reception, as well as between the data and the transmission of acknowledgments. Often, this IFS is substantially smaller in duration than the DIFS or EIFS, and is referred to as a short-interframe space (SIFS). In this case, the full-duplex nodes can adjust the duration of IFS's to a duration between the DIFS and the EIFS to adjust fairness. If all the full-duplex nodes adjust the duration of IFS to EIFS, then full fairness can exist between the half-duplex nodes and the full-duplex nodes, with the downside being the possibility of throughput degradation. As secondary exemplary way of dealing within the half-duplex disadvantage is to upgrade the software on 802.11 compliant legacy half-duplex nodes such that they have a full-duplex compatibility feature which allows suppression of the EIFS when they receive a CTS not intended for them.

As disclosed herein, communication nodes are computing devices capable of communicating with other enabled communication nodes. For example, in a wired network, each computer, router, server, etc. represents an individual communication node. Computing devices which utilize wireless networks can include desktop computers, laptops, smartphones, tablets, and other electronic devices capable of communicating in a wireless local area network. For example, if a device can communicate with other devices using IEEE communication standards, such as IEEE standard 802.11, that device is a communication node. In addition, non-network communication nodes such as walkie-talkies and amateur radios can also implement the disclosed principles to allow for full-duplex communications with other non-network communication nodes. Each node contains a transmitter, a receiver, both a transmitter and a receiver, or multiple transmitters and/or receivers.

The improved MAC disclosed herein is backwards compatible with IEEE standard 802.11 and enables coexistence of both full-duplex and half-duplex devices. While multiple changes to the MAC are disclosed and presented, not every change must be implemented simultaneously. For example, in certain embodiments, every improvement disclosed herein will be implemented, whereas in other embodiments single improvements or combinations of improvements can be implemented.

The primary access method of the IEEE 802.11 MAC is the Distributed Coordination Function (DCF). The DCF requires a node wishing to transmit to listen for a DIFS interval prior to transmitting, and defer until the channel is available using random backoff periods. The improved MAC disclosed herein is presented for the DCF in an infrastructure mode but can also be extended to other 802.11 modes. Specifically, the DCF of the 802.11 should be modified as follows: (a) A full-duplex enabled node is required to use RTS/CTS protocols to initiate full-duplex operation to another full-duplex node, but it can also operate in half-duplex without RTS; (b) After the RTS/CTS handshake, both nodes can send and receive at the same time in the same frequency channel; (c) If a node has sent a DATA frame, then it can receive full-duplex (FD) DATA and send an acknowledgment (ACK) before receiving its expected ACK for the data it sent; and (d) ACK timeouts are adjusted to allow asymmetry in DATA frame sizes.

Some specific highlights of the improved MAC are the RTS/CTS overhead, coexistence with previously deployed half-duplex nodes, asymmetric traffic, and intelligent choice of when to communicate in full-duplex versus half-duplex. The RTS/CTS overhead refers to the use of a RTS and CTS exchange/handshake to signal the start of full-duplex communication, rather than simply initiating full-duplex without the nodes being prepared or otherwise ready for communications. The RTS/CTS overhead disclosed herein is amortized over two packets, and results in performance gains no worse than an approach lacking such signaling. In addition, the RTS/CTS overhead results in both nodes being prepared for full-duplex communications, where both nodes can synchronize the transmission of DATA from each node, can provide backwards compatibility, and can protect against erroneous transmissions to or from hidden/unidentified nodes.

Coexistence with previously deployed half-duplex nodes allows communication nodes upgraded with the disclosed improved MAC design to communicate both with other full-duplex enabled communication nodes and with half-duplex only communication nodes. However, such coexistence can require queue management at the Access Point node, or a common node, to ensure fair coexistence and communications between the various nodes.

One purpose of the improved MAC is to provide for asymmetric traffic in a single frequency channel, with the aspiration of doubling the communication efficiency by concurrently sending DATA frames in both directions. This efficiency can be best achieved when there is an equal packet size in both directions. The ACK timeouts are adjusted to handle unequal sized DATA frames in each direction, and the queue management at the access point selects packets to send in full-duplex on the downlink. Yet another configuration has communication node receiving from one station while transmitting in full-duplex to a second, different, station.

The system can make an intelligent choice of when to communicate in full-duplex by using the RTS/CTS packets to estimate signal quality. For example, in embodiments where a number of nodes are attempting communicate with an Access Point, the Access Point might place communication nodes with poor quality lower in the queue than nodes with high quality RTS/CTS communications. Alternatively, the Access Point might place those nodes with poor quality communications higher in the queue to ensure sufficient time for the communications.

These and various additional embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts is disclosed herein. A more detailed description of the improved MAC will then follow. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored in other computer-readable memory locations.

Figure 2:
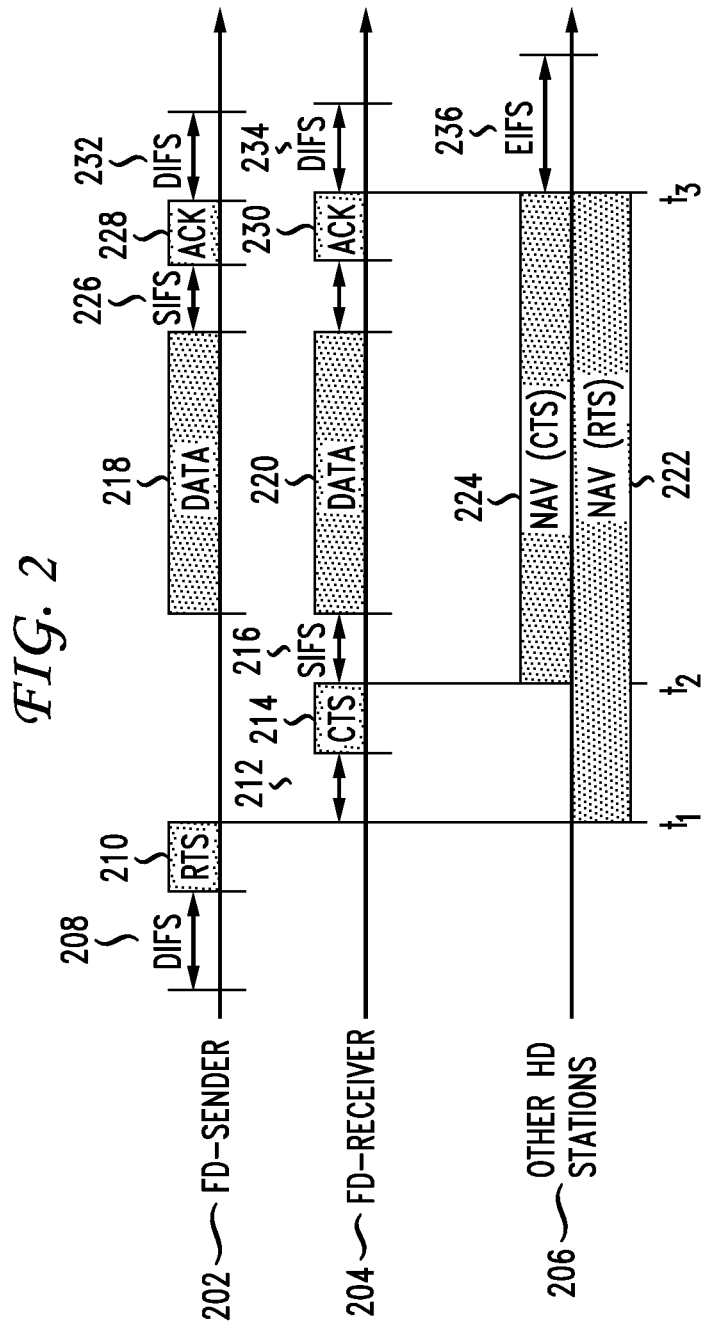
FIG. 2 illustrates an example of full-duplex communications initiated using RTS/CTS signaling.

Having disclosed some components of a computing system, the disclosure now turns to FIG. 2, which illustrates an example of full-duplex communications initiated using RTS/CTS signaling. As illustrated, FIG. 2 shows a typical full-duplex framing structure, where a FD sender node 202 has information to exchange with a FD receiver node 204. In this case, the FD receiver node 204 also has data 220 to transmit to the FD sender node 202. After waiting a required amount of time identified by the DIFS 208 after previous communications involving at least one of the nodes, or nodes utilizing the same frequency channel, and determining that the channel is idle (i.e., no active transmitters), the FD sender node 202 transmits a RTS 210 to the FD receiver node 204. This RTS 210 can have header information indicating the desired FD receiver node 204 as the intended destination node, the amount/size of the data to be transmitted, data type, or other needed information. Alternative, the RTS 210 can be only a request, with no additional header data indicative of the contents contained therein. Often the RTS 210 will contain a duration field specified in the NAV having a duration 222 based on the frame length. In certain configurations, the NAV can be separate from the RTS, but sent in association with the RTS. The NAV duration 222, 224 can indicate the amount of time (t1-t3) the FD sender node 202 will be transmitting data. This indication in the NAV signal provides a duration 222, 224 which signals to other nodes, not part of the communication link, to ignore any collisions detected, and can similarly instruct those nodes to ignore any data received during the NAV time period. For instance, if the FD sender node 202 sends an RTS 210 having a NAV duration 222 of 20 μs, nodes other than the FD receiver node 204 should ignore any collisions detected on the full-duplex frequency or channels during that NAV duration 222. After sending the RTS 210, the FD sender node 202 waits for a CTS response from the FD receiver node 204.

Upon receiving the RTS 210, the FD receiver node 204 needs to send a CTS 214, however prior to doing so the FD receiver node 204 first searches for other packets which need to be transmitted to the FD sender node 202. If there exist packets to transmit to the FD sender node 202, full-duplex mode will be used. The scheduler at the FD receiver node 204 ensures that these packets are at the head of the transmit queue for transmission, then prepares a CTS 214. This time after receiving the RTS and prior to transmitting the CTS is identified in FIG. 2 as a Short-InterFrame-Space (SIFS) 212. This SIFS can be predetermined or immediately determined, and can be of fixed length or dynamically adjusted based on current node requirements, current processing requirements, or other circumstances. At the conclusion of the SIFS 212, the FD receiver node 204 transmits the CTS 214, which, like the RTS 210, can contain a NAV indicating packet size/frame length (t2-t3) 224. As illustrated, both the FD sender node 202 and the FD receiver node 204 have transmitted NAVs indicating to the other node the length of transmission to expect 222, 224 and indicating to nodes not part of the communication link to ignore the data they are about to receive or otherwise ignore collisions during the NAV periods of time 222, 224, as illustrated by the timeline extending from t1-t3. However, while this example illustrates both nodes 202, 204 transmitting NAVs, other configurations can have just one node send a NAV or neither node send a NAV. When neither node sends a NAV, nodes not part of the communication link which unintentionally receive the signal can be forced to decode header information of the unintended packets they receive in order to determine what data is intended for them and what data is not intended for them. By having the NAV data, the FD sender node 202 and the FD receiver node 204 do not always need to decode the header information, resulting in faster communication potential and larger bandwidth.

The FD receiver node 204, upon receiving the RTS 210, searches to find an appropriate data packet to transmit. In the standard 802.11 protocol, or in other communication protocols, the RTS receiver 204 sends a CTS frame 214 and listens for incoming data. However, communication nodes enabled per this disclosure can also, if data is available in the queue, transmit data immediately after sending the CTS frame 214. In certain situations there may not be a packet intended for the FD sender node 202 at the head of the queue in the FD receiver node 204 transmit buffer. When this occurs, the FD receiver node 204 can inspect its queue to find the first data packet intended for transmission to the FD sender node 202. The secondary packet data length (the length of the data packet found in the FD receiver node 204 queue that is intended for transmission to the FD sender node 202) must be less than or equal to the length of the primary packet obtained from FD sender node 202 (known from NAV data). In another aspect, the packet length of the packet intended for transmission to the FD sender node 202 can be greater than the length of the primary packet or may be independent of any comparison of packet length. The first data packet intended for transmission to the FD sender node 202 is then dequeued (retrieved or pulled out of order from the queue). This out-of-order data packet can be used for the secondary transmission, which is the transmission that occurs after transmitting the CTS frame 214.

Because RTS 210 and CTS 214 communications are broadcast as electromagnetic signals, other communication nodes 206 can receive these signals. The other communication nodes 206 can be half-duplex legacy systems, or alternative, can be full-duplex nodes not engaged in the immediate data exchange. Upon receiving the unintended signal, these other communication nodes 206 remain silent and ignore all collisions on the channel until the end of NAV duration 224 indicated in the CTS 214 or RTS 210 signals. In the illustrated example, upon receiving the RTS 210 signal, the other, unintended nodes would ignore collisions from t1-t3 based on the RTS (NAV) duration 222. If there were no RTS (NAV), those other unintended nodes would similarly ignore collisions from t2-t3 based on the CTS (NAV) duration 224.

Upon receiving the CTS 214, the FD sender node 202 prepares to send DATA 218, while the FD receiver node 204 likewise prepares to send DATA 220. After waiting for another SIFS 216, both the FD receiver node 204 and the FD sender node 202 transmit DATA 218, 220 simultaneously over the same channel. After completion of the data transmissions 218, 220, both nodes 202, 204 wait for acknowledgment (ACK) 228, 230 from the other node that the data 218, 220 was successfully received. These ACK 228, 230 signals are received after yet another SIFS 226 following the termination of the data packets 218, 220. At this point the FD sender node 202 and the FD receiver node 204 wait for a designated DCF Interframe Space (DIFS) 232, 234 for a random backoff period before contending for the channel's next transmission. The other nodes 206, which had been in a silent mode ignoring collisions, can also wait for the DIFS backoff period. Alternatively, should errors have been encountered, the FD sender node 202, the FD receiver node 204, or the other nodes 206 can wait for an Extended Interframe Space (EIFS) 236, used to help ensure that errors and collisions have ended prior to beginning the next transmission. Generally, nodes wait the DIFS between communication rounds rather than the EIFS. For example, the nodes of the communication link transmit their respective ACKs, then wait for a time period equal to DIFS, then begin the next round of communications. Had errors been detected, the nodes instead could have waited for the time period EIFS.

As a non-limiting example of the durations of timings used in this example, DIFS=34 μs, RTS=36 μs, SIFS=16 μs, Data=704 μs (at 18 Mbps), ACK=32 μs. Further note that the ACKs are synchronized. Even if the nodes have different packet sizes, particularly for the DATA 218, 220, the ACKs 228, 230 can only be initiated after the longer packet has completed its transmission.

Figure 3:
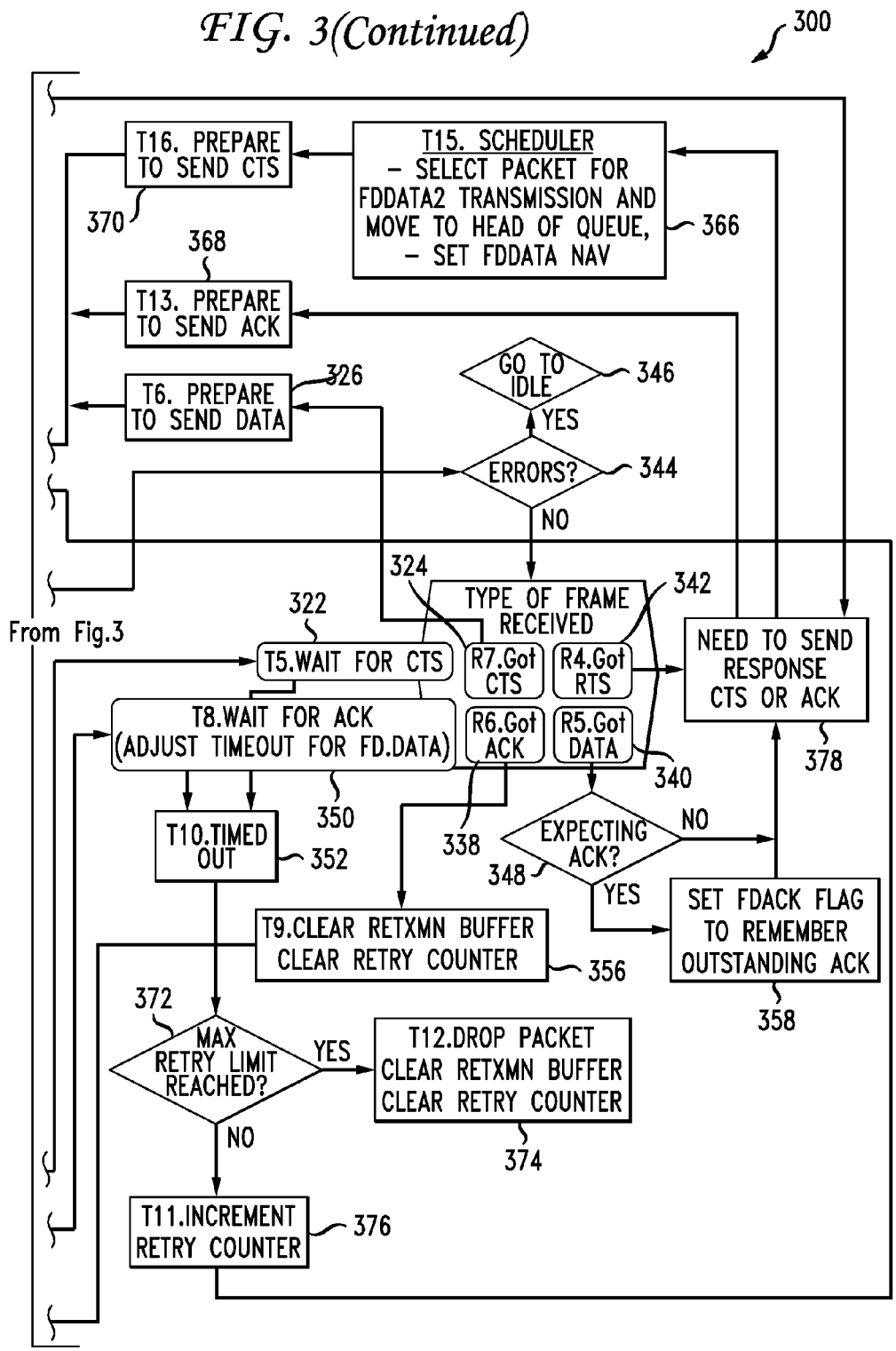
FIG. 3 illustrates an exemplary flow chart of an improved full-duplex MAC communication protocol.

FIG. 3 illustrates an exemplary flow chart of an improved full-duplex MAC communication protocol. This exemplary MAC 300 is implemented on each full-duplex enabled communication node, and illustrates steps the communication node can undertake when only transmitting (314), when only receiving 316, or when both transmitting and receiving (318) using the full-duplex enablement. Because each full-duplex enabled node in a communication link could have the illustrated MAC 300 enabling the full-duplex communications, the following description will use two exemplary nodes STA(1) and STA(2) to illustrate full-duplex communications between two nodes using the illustrated MAC. In one configuration, STA(1) could represent an Access Point (AP) node, acting as a hub for multiple communication nodes, and STA(2) could represent one of those communication nodes. In other embodiments, there can be more than two nodes communicating with one another.

A communication node STA(2) is in idle 302, and receives a packet from a higher layer of the node (304) which needs to be communicated to communication node STA(1). The STA(2) may need to wait (306) based on the current status of its receiver. For example, if the receiver of STA(2) continues to receive packets, and it could be more efficient to wait and transmit/receive the future data in full-duplex, the node can determine that a waiting period is preferable. This waiting period can be specific to received data, or an indefinite period of time, depending on specific configurations. If the channel is idle (i.e., no active transmitters), the STA(2) node sends a RTS frame (314) to the STA(1) node with the duration field specified in the NAV based on the frame length. While an RTS is not required to contain a NAV, doing so informs the other node how long the expected transmission will last and makes other nodes not in the communication link ignore collisions and data not intended for them for a period of time equal to the NAV. After sending the RTS (320), the STA(2) node waits to receive a CTS response (322) from the STA(1) node.

Assuming correct transmission, the STA(1) node begins receiving (328) the data from the STA(2) node, determines a frame for this station (330), checks the received data for errors 344, and determines what type of frame was received (324, 338, 340, 342). If errors are found, the node returns to idle (346). In this case, because the STA(1) node received an RTS, the STA(1) node identifies the frame as an RTS (342) and that the STA(1) node needs to send a CTS response (378). If the STA(1) node has a packet to send to the STA(2) node, full-duplex mode (318) will be used. The scheduler of the STA(1) node searches for the packet to be sent to the STA(2) node, ensuring that it is at the head of the transmit queue for transmission (366). The STA(1) node then prepares the CTS (370) and transmits the CTS by first backing off (308) for a SIFS period, identifying that transmission needs to occur (314), and that the type of frame to be transmitted is a CTS (334). The CTS, like the RTS, can contain a NAV indicating how much data the node has to send or how long a transmission is planned to last. The STA(1) node then transmits the CTS to the STA(2) node. When the full-duplex NAV is set (360), either from the RTS or CTS, the node can begin to prepare to send data in full-duplex (362). When other nodes beside the STA(1) or STA(2) nodes receive the NAV, those nodes remain silent and ignore all collisions on the channel until the end of the NAV duration defined.

The STA(2) node receives the CTS (328), leaving the "Wait for CTS" (322) step, then frames the CTS (330), recognizes that the node is in a receive only phase 316, and identifies the received frame as a CTS (324). The STA(2) node then prepares to send the data (326) and waits for a backoff time (308). This backoff time, or SIFS, can be predetermined or determined based on current node and communication link conditions. Where both nodes are full-duplex enabled and operating as such, the STA(2) node prepares the primary full-duplex data frame FDDATA1 (318, 336). If the STA(1) node were only sending/receiving in half-duplex, the STA(2) node would instead prepare only half-duplex data (314).

If the STA(1) node, operating in full-duplex, has data to send, after sending the CTS (334) the node prepares to send full-duplex data (362), waits for the backoff time (308), then prepares and transmits the secondary full-duplex data FDDATA2 (318, 336). Both data frames FDDATA1 and FDDATA2 travel in different directions at the same time. Both nodes wait for an acknowledgement signal ACK after sending the data (350). Because both nodes are expecting an ACK 348, they set a full-duplex acknowledgment (FDACK) flag to remember to wait for the ACK (358). After setting the flag, both nodes prepare the ACK 368, wait for a SIFS or other backoff time (308) after any data transmission has finished, and send the ACK (332). Both nodes then prepare to receive an ACK (350) based on the data they just transmitted. Because nodes cannot wait indefinitely for an acknowledgment, they can set a timeout period for receiving the ACK. This timeout period The ACK timeout is adjusted to the end of the NAV to allow the other node to finish transmitting a data frame that may be longer.

At each node, when the ACK is received as expected, the node waits for DIFS (DCF Interframe Space) (308) and a random backoff period prior to contending for the channel for the next transmission. At multiple points throughout the MAC 300, if the queue is empty (364) the communication node can return to an idle state (302). If, however, the queue is not empty the node will need to backoff or wait for a time period (308) prior to resuming transmitting and/or receiving data. When the associated wait time has expired (310), the node can then determine if the full-duplex NAV period is ongoing (312), at which point the node can return to a waiting mode (308) or continue full-duplex communications (318).

After each node transmits its ACK (332), each node can check to see if the flag previously set (358) is still present (354). If not, then the node can check to see if the queue is empty (364) and return to idle (302). When waiting for the ACK, if a time limit is met (352) and the node times out of waiting, the node determines if a maximum number of retries has occurred (372). If the maximum number of retries has occurred, the node drops the remaining packet, clears the retransmit (RETXMN) buffer, and clears the retry counter (374). If the maximum number of retries has not occurred, the node increments the retry counter (376), waits the specified time period 308, and retransmits the data (318, 336). Similarly, if either node has received the ACK (338), that node may need to clear certain buffers and counters (356), such as the RETXMN buffer and the retry counter.

Having disclosed some basic system components and concepts, the disclosure now turns to the exemplary method embodiment shown in FIG. 4. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 transmits to a communication node a RTS for first data to the communication node (402). This RTS signal can follow a predetermined period of time from a previous transmission, detection of an error signal, or can be the initial signal transmitted by a communication node. The system 100 then receives a response from a communication node indicating availability (404). The communication node can be a laptop, cellular tower, Internet router, cellphone, smartphone, walkie-talkie, or other types of communication devices capable of wireless communications via standards such as IEEE 802.11. The response indicating communication availability can indicate that the system 100 can send the signal, and can be referred to as a clear-to-send (CTS) response. This exchange of a RTS signal and a CTS signal can be referred to as a RTS/CTS handshake. Upon receiving the response, the system 100 transmits to the communication node the first data on a frequency while receiving a second data from the communication node on the frequency (406). This exchange of data between the system 100 and the communication node in a frequency can be referred to as full-duplex communications. The first data and the second data can be configured to match in size, or can be configured to have different sizes. In addition, the data or the RTS/CTS exchange can provide a Network Allocation Vector (NAV) indicating the size of the data packets to be transmitted and/or received, or alternatively, can indicate the amount of time the transmission is expected to last. The NAV can include data such as a duration in time or space, how long full-duplex communications should occur, when to switch to half-duplex communications, when to change channels, when to begin receiving data intended for all nodes, or other timing information pertinent to all nodes in the communication network. In addition, nodes receiving either the RTS or CTS can update NAV data if the packet size for the data is larger or smaller than the previously received NAV.

Upon transmitting and receiving the first data and second data, respectively, the system 100 transmits a first acknowledgement indicating reception of the second data while receiving, from the communication node, a second acknowledgement indicating reception at the communication node of the first data (408). There can exist a time period, known as a SIFS between the transmission/reception of the data and the transmission/reception of the acknowledgements. Transmission and reception of the acknowledgements can occur in the same frequency and channels as the first and second data, or can occur in different channels or on different frequencies. In many configurations, the system 100 and the communication node have identical lengths of first data and second data being transmitted. This match can be coordinated by NAV data accompanying the RTS and CTS signals, and can be predetermined or dynamically determined based on current circumstances.

In certain instances and embodiments, the frequency can comprise multiple channels, which may or may not be contiguous. For instance, in certain embodiments, the system can transmit the first data to the communication node in two separate channels while receiving second data from the communication node in those separate channels. In other configurations, the system 100 can transmit the first data to a first communication node in a frequency while receiving second data from a second communication node in the same frequency. Such a configuration could rely upon headers, NAV data, and other information to determine the intended destination of the first/second data. In yet other configurations, the system 100 can transmit the first data to multiple communication nodes while receiving data from a single communication node, which can be one of the multiple communication nodes or can be an entirely separate communication node.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as described above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to digital and analog full-duplex communications. Various modifications and changes that may be made to the principles described herein without following the example embodiments and applications illustrated and described herein, and without departing from the spirit and scope of the disclosure.

We claim:

1. A method comprising:
   transmitting, from a first node and to a second node, a request-to-send first data to the second node;
   receiving, at the first node and from the second node, a response indicating availability;
   transmitting, from the first node and to the second node, the first data on a frequency channel while receiving, at the first node, a second data from the second node on the frequency channel, to yield full duplex data communications between the first node and the second node;
   selecting a dynamically updated short-interframe-space waiting period that defines a waiting period before a transmission of an acknowledgement of receipt of data; and
   after transmitting the first data to the second node and waiting the dynamically updated short-interframe-space waiting period during which time no data is transmitted by the first node or the second node, transmitting, from the first node to the second node, a first acknowledgement indicating reception of the second data while receiving, at the first node and from the second node, a second acknowledgement indicating reception at the second node of the first data.

2. The method of claim 1, wherein the transmitting of the first acknowledgment and the transmitting of the first data occur in the frequency channel.

3. The method of claim 1, wherein the transmitting of the first acknowledgement and the transmitting of the first data occur in distinct frequency channels.

4. The method of claim 1, further comprising transmitting the first data and receiving the second data only after waiting, after receiving the response indicating availability, a short-interframe- space provided time.

5. The method of claim 1, wherein the second data was taken out-of-order from a queue associated with the second node.

6. The method of claim 1, wherein the first data and the second data have one of identical packet sizes and asymmetric packet sizes.

7. The method of claim 1, wherein the response comprises a network-allocation-vector indicating a length of transmission; and
   wherein the method further comprises timing transmission of the first data and the first acknowledgment based on the network-allocation-vector.

8. The method of claim 1, further comprising:
   after receiving from the second node the response indicating availability, only transmitting the first data and the first acknowledgement to the second node upon determining that the second node is full-duplex enabled.

9. A system comprising:
   a processor; and
   a computer-readable storage medium storing instructions which, when executed by the processor, cause the processor perform operations comprising:
   transmitting, from the system to a communication node, a request-to-send first data to the communication node;
   receiving, at the system and from the communication node, a response indicating availability;
   transmitting, from the system and to the communication node, the first data on a frequency channel while receiving, at the system, a second data from the communication node on the frequency channel, to yield full duplex data communications between the system and the communication node;
   selecting a dynamically updated short-interframe-space waiting period that defines a waiting period before a transmission of an acknowledgement of receipt of data; and
   after transmitting the first data to the communication node and waiting the dynamically updated short-interframe-space waiting period during which time no data is transmitted by the first node or the second node, transmitting, from the first node to the second node, a first acknowledgement indicating reception of the second data while receiving, at the first node and from the second node, a second acknowledgement indicating reception at the second node of the first data.

10. The system of claim 9, wherein the transmitting of the first acknowledgment and the transmitting of the first data occur in the frequency channel.

11. The system of claim 10, wherein the transmitting of the first acknowledgement and the transmitting of the first data occur in distinct frequency channels.

12. The system of claim 9, the computer-readable storage medium having additional instructions stored which, when executed by the processor, cause the processor to perform operations comprising transmitting the first data and receiving the second data only after waiting, after receiving the response indicating availability, a short-interframe-space provided time.

13. The system of claim 9, wherein the second data was taken out-of-order from a queue associated with the communication node.

14. The system of claim 9, wherein the first data and the second data have one of identical packet sizes and asymmetric packet sizes.

15. The system of claim 9, the computer-readable storage medium having additional instructions stored which, when executed by the processor, cause the processor to perform operations comprising:

after receiving from the communication node the response indicating availability, only transmitting the first data and the first acknowledgement to the communication node upon determining that the communication node is full-duplex enabled.

16. The system of claim 9, wherein the response comprises a network-allocation-vector indicating a length of transmission; and wherein the computer-readable storage medium has additional instructions stored which, when executed by the processor, cause the processor to perform operations comprising timing transmission of the first data and the first acknowledgment based on the network-allocation-vector.

17. A computer-readable storage device having instructions stored which, when executed by a first node, cause the first node to perform operations comprising:

transmitting, from the first node and to a second node, a request-to-send first data to the second node;

receiving, at the first node and from the second node, a response indicating availability;

transmitting, from the first node and to the second node, the first data on a frequency channel while receiving, at the first node, a second data from the second node on the frequency channel, to yield full duplex data communications between the first node and the second node;

selecting a dynamically updated short-interframe-space waiting period that defines a waiting period before a transmission of an acknowledgement of receipt of data; and after transmitting the first data to the second node and waiting the dynamically updated short-interframe-space waiting period during which time no data is transmitted by the first node or the second node, transmitting, from the first node to the second node, a first acknowledgement indicating reception of the second data while receiving, at the first node and from the second node, a second acknowledgement indicating reception at the second node of the first data.

18. The computer-readable storage device of claim 17, wherein the transmitting of the first acknowledgment and the transmitting of the first data occur in the frequency channel.

19. The computer-readable storage device of claim 18, wherein the transmitting of the first acknowledgement and the transmitting of the first data occur in distinct frequency channels.

20. The computer-readable storage device of claim 17, having additional instructions stored which, when executed by the first node, cause the first node to perform operations comprising transmitting the first data and receiving the second data only after waiting, after receiving the response indicating availability, a short-interframe-space provided time.

* * * * *